(12) United States Patent
Barton et al.

(10) Patent No.: US 8,989,355 B2
(45) Date of Patent: Mar. 24, 2015

(54) METHODS AND APPARATUSES FOR CALL MANAGEMENT ON A HEARING-IMPAIRED SIDE OF HEARING-IMPAIRED COMMUNICATION SYSTEMS

(71) Applicant: Sorenson Communications, Inc., Salt Lake City, UT (US)

(72) Inventors: Christine Barton, Herriman, UT (US); Michael R. Ohran, Orem, UT (US); Jeff Thompson, Centerville, UT (US)

(73) Assignee: Sorenson Communications, Inc., Salt Lake City, UT (US)

(*) Notice: Subject to any disclaimer, the term of this patent is extended or adjusted under 35 U.S.C. 154(b) by 0 days.

(21) Appl. No.: 13/838,718

(22) Filed: Mar. 15, 2013

(65) Prior Publication Data

US 2014/0270100 A1  Sep. 18, 2014

(51) Int. Cl.
*H04M 11/00* (2006.01)
*H04M 3/42* (2006.01)

(52) U.S. Cl.
CPC ................................ *H04M 3/42391* (2013.01)
USPC .......................................................... 379/52

(58) Field of Classification Search
None
See application file for complete search history.

(56) References Cited

U.S. PATENT DOCUMENTS

| 6,662,007 | B2 | 12/2003 | Yuen |
| 7,170,977 | B2* | 1/2007 | Doherty et al. ................. 379/52 |
| 7,295,663 | B2* | 11/2007 | McLaughlin et al. ... 379/212.01 |
| 7,746,984 | B2 | 6/2010 | Nola et al. |
| 7,769,141 | B2 | 8/2010 | Cupal et al. |
| 8,325,883 | B2 | 12/2012 | Schultz et al. |
| 8,478,316 | B2 | 7/2013 | Gould et al. |
| 8,553,849 | B2 | 10/2013 | Michaelis et al. |
| 2002/0098834 | A1* | 7/2002 | Yuen ............................. 455/420 |
| 2007/0081646 | A1 | 4/2007 | Cupal et al. |
| 2008/0031161 | A1 | 2/2008 | Osthus et al. |
| 2009/0028300 | A1* | 1/2009 | McLaughlin ................... 379/52 |
| 2009/0174759 | A1 | 7/2009 | Yeh et al. |
| 2009/0323911 | A1* | 12/2009 | Dury .......................... 379/88.22 |
| 2012/0196580 | A1 | 8/2012 | Simmons et al. |
| 2012/0249723 | A1 | 10/2012 | Nelson et al. |
| 2014/0267579 | A1 | 9/2014 | Montero et al. |
| 2014/0270101 | A1 | 9/2014 | Maxwell et al. |

* cited by examiner

*Primary Examiner* — Maria El-Zoobi
(74) *Attorney, Agent, or Firm* — TraskBritt

(57) ABSTRACT

Methods and apparatuses for enabling electronic communication with a hearing-capable user and a hearing-impaired user are disclosed. An identified entry is selected from a database comprising one or more entries, wherein each of the one or more entries is associated with a contact of the hearing-impaired user and includes one or more connection indicators for the contact and one or more custom greetings for the contact. The identified entry is selected responsive to the one or more connection indicators for the hearing-capable user. A calling connection from the hearing-capable user to a translator is established and the translator is instructed to greet the hearing-capable user with one of the one or more custom greetings.

25 Claims, 7 Drawing Sheets

Database Table – Deaf Party Contact-Specific Greetings

400

410

| | Name | Phone | Incoming Custom Greeting | Outgoing Custom Greeting |
|---|---|---|---|---|
| 1 | Sis | 800-555-1212 | Hi Sis, Hang on while I'm connected. | Hi Sis, What's up? |
| 2 | Dad | 802-555-1212 | Hi Dad, just a second... | Hi Dad, I need money! |
| . | | | | |
| . | | | | |
| . | | | | |
| n | John | 801-555-1212 | <blank> | |

Database Table – Deaf Party Default Greetings

460

| | Deaf Party | Default Incoming Custom Greeting | Default Outgoing Custom Greeting |
|---|---|---|---|
| 1 | John Doe | Hi, You've reached John, Hang on while I'm connected. | Hi, This is John calling |
| 2 | Jane Jens | Hello this is Jane, please hold while I'm being connected | Jane calling, hello? |
| . | | | |
| . | | | |
| . | | | |
| n | John Son | You've reached John's phone, I'm being connected, please wait. | <blank> |

METHODS AND APPARATUSES FOR CALL MANAGEMENT ON A HEARING-IMPAIRED SIDE OF HEARING-IMPAIRED COMMUNICATION SYSTEMS

TECHNICAL FIELD

Embodiments discussed herein relates generally to video phone communication systems, and more specifically, to methods and apparatuses for providing call management functions to persons less reliant on audible indications, such as hearing-impaired persons.

BACKGROUND

Video relay services (VRS) may be used so a hearing-impaired user can carry on conversations with a hearing-capable person. In such systems, the hearing-impaired user will call in to the VRS and get assigned to a translator. The hearing-impaired user will then use sign language to tell the translator the number to be called and the translator will place the call to the hearing-capable user. The translator will then wait for the call to be answered, state who the hearing-impaired user is that is calling, then begin the translation process between the two sides of the conversation.

Similarly, when a hearing-capable user makes a call to a hearing-impaired user, the translator must answer the call, usually very impersonally, then attempts to make the connection to the hearing-impaired user so the conversation between the two end parties can commence. Again, the hearing-impaired user has little control over the answering of the call and only gets involved after the translator has conversed with the hearing capable user.

These interventions by the translator in VRS systems make the calling process much less personal for both end parties and place the power and focus of the call management with the translator such that the hearing-impaired user is always very aware of the interpreter being the central point of any call.

Therefore, there is a need for methods and apparatuses that provide ways to place more of the call management control with the hearing-impaired user.

SUMMARY

Embodiments discussed herein include methods and apparatuses that provide ways to place call management control with the hearing-impaired user.

Embodiments of the present disclosure include a method for enabling electronic communication with a hearing-capable user and a hearing-impaired user. The method includes selecting an identified entry from a database comprising one or more entries, wherein each of the one or more entries is associated with a contact of the hearing-impaired user and includes one or more connection indicators for the contact and one or more custom greetings for the contact. The identified entry is selected responsive to the one or more connection indicators for the hearing-capable user. A calling connection from the hearing-capable user to a translator is established and the translator is instructed to greet the hearing-capable user with one of the one or more custom greetings.

Embodiments of the present disclosure include a relay service for providing translation services between a hearing-impaired user and a hearing-capable user. A database includes one or more entries, each of the one or more entries associated with a contact of the hearing-impaired user and including one or more connection indicators for the contact and one or more custom greetings for the contact. A profile system is configured to determine an identified entry in the database using a calling connection indicator associated with the hearing-capable user to compare with the one or more connection indicators. A call distribution system is configured to establish a calling connection over a voice-capable network with the calling connection indicator associated with the hearing-capable user and instruct a translator to answer the call with the hearing-capable user using one of the one or more custom greetings.

Embodiments of the present disclosure include a computing device for use by a hearing-impaired user, which includes a display for presenting a GUI to a hearing-impaired user, a memory configured for storing computing instructions, and a processor operably coupled to the memory and configured for executing the computing instructions. The computing instructions cause the processor to cause the display to present a call connection selector on the GUI and send instructions to a relay service to make a calling connection with a hearing-capable user at the direction of the hearing-impaired user without intervention from a translator responsive to the hearing-impaired user selecting the call connection selector.

BRIEF DESCRIPTION OF THE DRAWINGS

FIGS. 4 and 5 are block diagrams illustrating entries in database;

DETAILED DESCRIPTION

Figure 1:
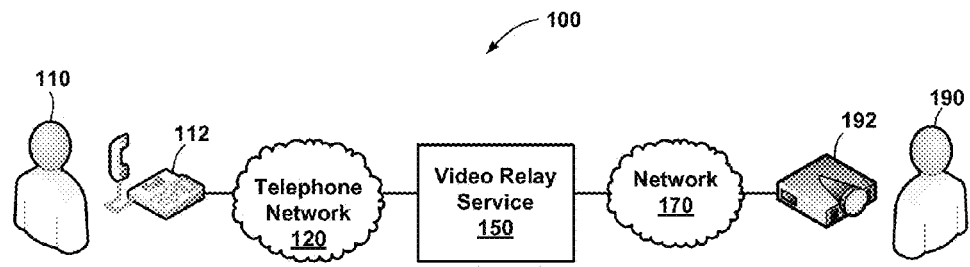
FIG. 1 is a simplified block diagram of a conventional hearing-impaired communication system.

In the following detailed description, reference is made to the accompanying drawings which form a part hereof, and in which is shown by way of illustration specific embodiments in which the invention may be practiced. These embodiments are described in sufficient detail to enable those of ordinary skill in the art to practice the invention. It should be understood, however, that the detailed description and the specific examples, while indicating examples of embodiments of the invention, are given by way of illustration only and not by way of limitation. From this disclosure, various substitutions, modifications, additions rearrangements, or combinations thereof within the scope of the present invention may be made and will become apparent to those of ordinary skill in the art.

In accordance with common practice the various features illustrated in the drawings may not be drawn to scale. The illustrations presented herein are not meant to be actual views of any particular method, device, or system, but are merely idealized representations that are employed to describe various embodiments of the present invention. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Those of ordinary skill in the art would understand that information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present embodiments may be implemented on any number of data signals including a single data signal.

Those of ordinary skill would further appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments discussed herein include methods and apparatuses that provide ways to place call management control with the hearing-impaired user. These embodiments help the deaf caller in a video relay call to have control of managing the call by giving the deaf caller the hang up and dial controls for the hearing party, and giving the deaf user a way to seamlessly instruct the translator as to greetings upon call connection. These embodiments also reduce the role of the translator in the call from a call manager to a call facilitator.

Beginning or ending a video relay call can be awkward. When the translator makes their own introduction on the call the hearing person can be confused about who they are on the phone with and may think it's a suspicious call instead of knowing it's their deaf acquaintance. If a deaf caller wants to hang up on a hearing person they must ask the translator to do it, which loses the effect. In previous systems, the translator manages the call connection and greeting. The deaf person sometimes feels like a third party on the call they initiated.

Having the action of the deaf caller automatically initiate the connection or disconnection of the hearing party they are calling gives the deaf caller a seamless way to tell the translator what the greeting should be without slowing the call flow. This way, the deaf caller is in control of managing the call, and the translator is simply facilitating.

Deaf callers will be able to have a more natural communication pattern with hearing parties; the confusion will be lessened and more productive communication can happen. Fewer hearing people will hang up because they are confused about the nature of the call.

FIG. 1 illustrates a conventional communication system 100 useful for the hearing-impaired. The communication system 100 enables a hearing-impaired user 190 (may also be referred to herein as a deaf party 390) to engage in conversation through the communication system 100 with a hearing-capable user 110. The hearing-impaired user 190 may exhibit varying levels of impairment and may be a voice-capable hearing-impaired user or a voice-incapable hearing-impaired user. A communication session between the users is facilitated through the use of various equipments, which are preferably coupled together using one or more networks (120, 170), which may include a telephone network such as the Public Switched Telephone Network (PSTN). Alternatively, use of the term "telephone network" as used herein also contemplates other networks that are compatible and configured to provide communications using digital standards and data packets, an example of which includes Voice Over Internet Protocol (VOIP).

To interface a hearing-impaired user into a generally voice-based communication system, interpretive services are employed allowing hearing-impaired users to communicate with a translator, such as, for example, through sign language. One means for relaying the communicative expressions of a hearing-impaired user 190 within the communication system 100 incorporates a video phone 192 for capturing and displaying the communicative expressions exhibited by the hearing-impaired user 190 and for displaying interpreted voice information originating from the hearing-capable user 110. The expressions, such as sign language and/or body language, may be interpreted or translated by a Video Relay Service (VRS) 150. The hearing-capable user 110 interacts in a conventional manner with the VRS 150 through a voice-based dialogue conveyed over a conventional voice phone 112 and occurring between the hearing-impaired user 190 and a translator at the VRS 150.

Figure 2:
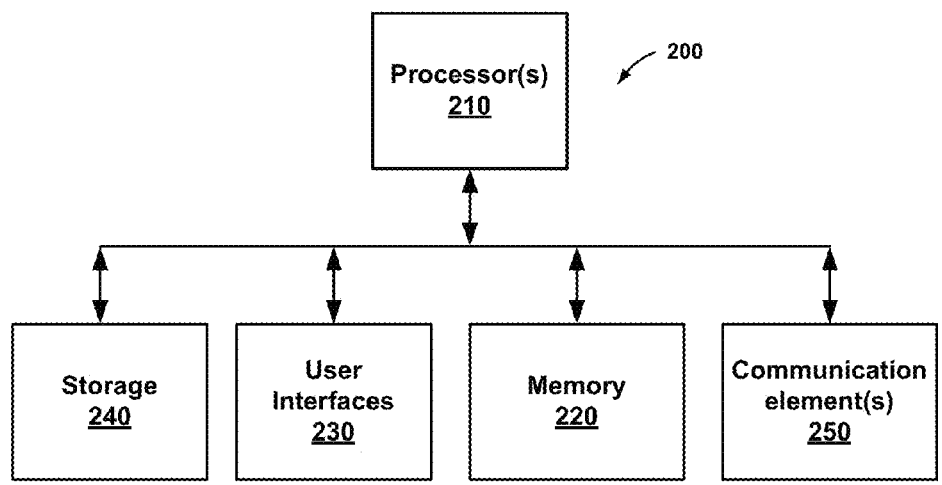
FIG. 2 is a simplified block diagram of processing hardware that may be used in accordance with one or more embodiments of the invention.

FIG. 2 illustrates a computing system 200 for practicing embodiments of the present disclosure. Computer, computing system, and server may be used interchangeably herein to indicate a system for practicing some embodiments of the present disclosure. The computing system 200 is configured for executing software programs containing computing instructions and may include one or more processors 210, memory 220, one or more communication elements 250, user interface elements 230, and storage 240.

As non-limiting examples, the computing system 200 may be a user-type computer, a file server, a compute server, a notebook computer, a tablet, a handheld device, a mobile device, or other similar computer system for executing software.

The one or more processors 210 may be configured for executing a wide variety of operating systems and applications including the computing instructions for carrying out embodiments of the present disclosure.

The memory 220 may be used to hold computing instructions, data, and other information for performing a wide variety of tasks including performing embodiments of the present disclosure. By way of example, and not limitation, the memory 220 may include Synchronous Random Access Memory (SRAM), Dynamic RAM (DRAM), Read-Only Memory (ROM), Flash memory, and the like.

Information related to the computing system 200 may be presented to, and received from, a user with one or more user interface elements. As non-limiting examples, the user interface elements may include elements such as displays, keyboards, mice, joysticks, haptic devices, microphones, speakers, cameras, and touchscreens. A display on the computing system may be configured to present a graphical user interface (GUI) with information about some embodiments of the present disclosure, as is explained below.

The communication elements 250 may be configured for communicating with other devices or communication networks. As non-limiting examples, the communication elements 250 may include elements for communicating on wired and wireless communication media, such as for example, serial ports, parallel ports, Ethernet connections, universal serial bus (USB) connections IEEE 1394 ("firewire") connections, Bluetooth wireless connections, 802.1 a/b/g/n type wireless connections, and other suitable communication interfaces and protocols.

The storage 240 may be used for storing relatively large amounts of non-volatile information for use in the computing system 200 and may be configured as one or more storage devices. By way of example, and not limitation, these storage devices may include computer-readable media (CRM). This CRM may include, but is not limited to, magnetic and optical storage devices such as disk drives, magnetic tapes, CDs (compact disks), DVDs (digital versatile discs or digital video discs), and other equivalent storage devices.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. It will be appreciated by those of ordinary skill in the art that many steps and processes may occur in addition to those outlined in flow charts. Furthermore, the processes may be implemented in any suitable hardware, software, firmware, or combinations thereof.

When executed as firmware or software, the instructions for performing the processes may be stored on a computer-readable medium. A computer-readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

By way of non-limiting example, computing instructions for performing the processes may be stored on the storage 240, transferred to the memory 220 for execution, and executed by the processors 210. The processors 210, when executing computing instructions configured for performing the processes, constitutes structure for performing the processes and can be considered a special-purpose computer when so configured. In addition, some or all portions of the processes may be performed by hardware specifically configured for carrying out the processes.

The computing system 200 may be used for the video phones, servers, and computers, computing devices, processing devices, and communication devices described herein with varying levels of optional components.

Generally, when discussing calls, they are referred to from the deaf user's perspective. Thus, an "incoming call" is from a hearing-capable user to a hearing-impaired user and an "outgoing call" is from a hearing-impaired user to a hearing-capable user.

Figure 3A:
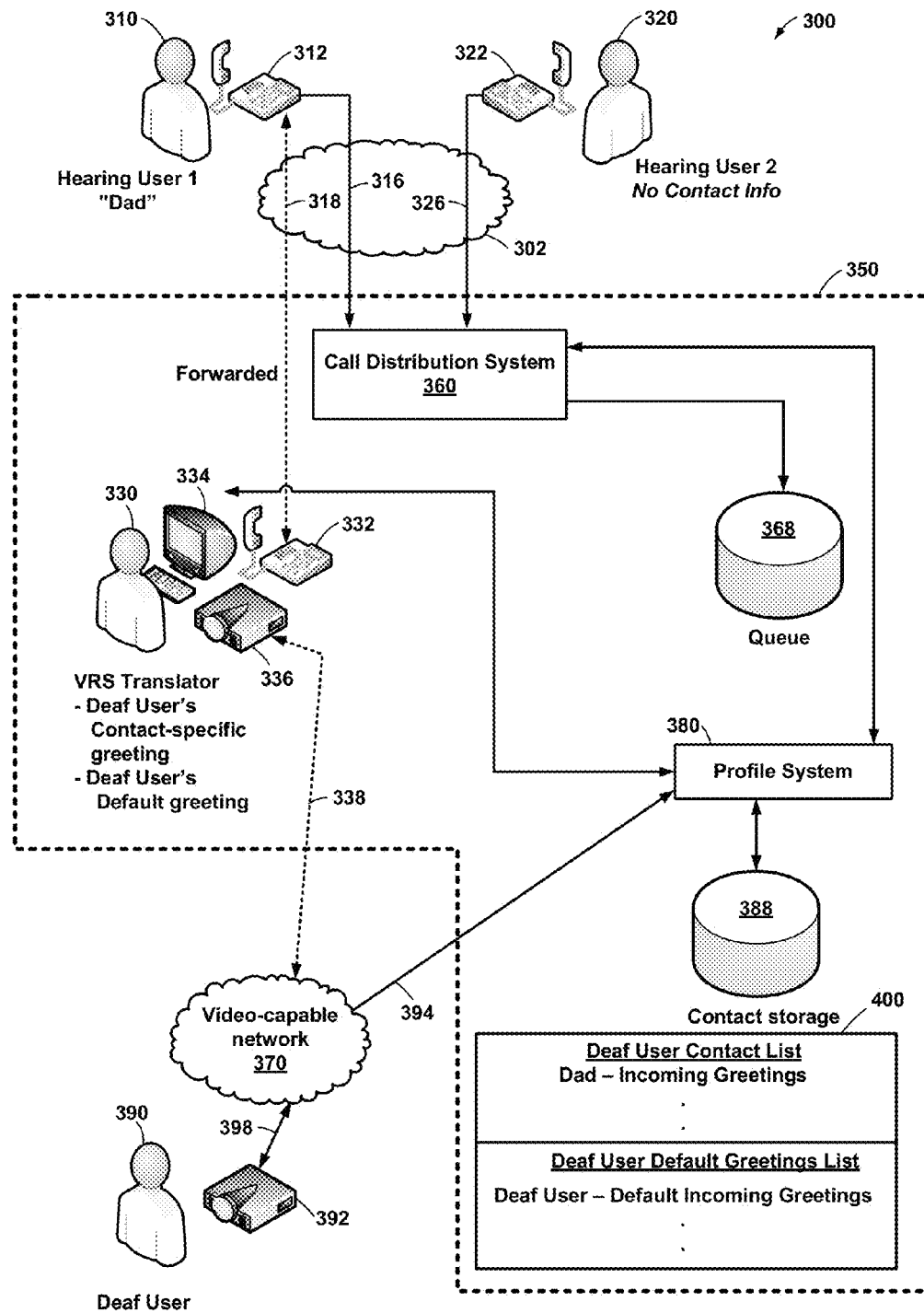
FIG. 3A illustrates a simplified block diagram illustrating a VRS configured for operation with a hearing-impaired communication system and showing a calling process to a hearing-impaired user.

FIG. 3A illustrates a simplified block diagram illustrating a VRS configured for operation with a hearing-impaired communication system and showing a calling process to a hearing-impaired user. The communication system 300 includes one or more hearing-impaired communication systems 392 (one system shown in FIG. 3 for clarity), one or more voice-capable communication systems (312 and 322) and a VRS 350 (also referred to herein as a relay service 350).

The hearing-capable user 310, 320 may use voice-capable equipment 312, 322 to communicate with the VRS 350 through voice-capable connections 316, 326 to a voice-capable network 302. The hearing-impaired user 390 may use the video-capable equipment 392 (also referred to herein as a video phone 392) to communicate with the VRS 350 through a video-capable network 370.

As used herein, voice-capable networks 302 and voice-capable equipment 312, 322 means networks and equipment that can process, convey, reproduce, or a combination thereof, sounds in the auditory frequencies as analog signals, digital signals or a combination thereof. As non-limiting examples, such equipment includes conventional telephones, conventional cellular telephones, and conventional computers or handheld devices with microphone and speaker type capabilities. As non-limiting examples, such networks include a telephone network such as the Public Switched Telephone Network (PSTN) and other networks that are compatible and configured to provide communications using digital standards and data packets, an example of which includes Voice Over Internet Protocol (VOIP).

As used herein, video-capable networks 370 and video-capable equipment 392 means networks and equipment that can process, convey, reproduce, or a combination thereof, multi-frame images. As non-limiting examples, such equipment includes conventional cellular telephones with video capability, and conventional computers or handheld devices with camera and display type capabilities. As non-limiting examples, such networks include cellular networks, WiFi networks, wide area networks, hard wired networks and other private data networks configured to provide communications using digital standards and data packets. To facilitate the enhanced bandwidth needs of video phones 392, the video-capable network 370 may be implemented as a high bandwidth network such as a DSL, Cable, Ethernet or other enhanced-bandwidth networking technology.

Wireless networks may include any network using wireless electromagnetic signals, such as, for example, Wi-Fi, cellular phone networks, bluetooth, Zigbee, and near-field communication, that is capable of carrying information including at least audio signals and in some embodiments video signals.

In general, most video-capable networks 370 would be considered to also be voice-capable networks 302 and most video-capable equipment 392 would also be considered to be voice-capable equipment 312, 322.

Within the VRS 350, a call distribution system 360 answers calls from hearing-capable users 310, 320 through calling connections 316, 326 and routes them to translators 330 (only one shown in FIG. 3 for clarity) or places them in a queue 368. The incoming calls include a calling connection indicator such as, for example, a telephone number, an Internet Protocol (IP) address, a website address or other unique indicator that indicates how the connection is made and from where the connection is made.

The call distribution system 360 may also query a profile system 380 to determine information about the hearing-capable user 310, 320 placing the call in response to the calling connection indicator, as is explained more fully below in the descriptions of FIGS. 4 and 5. The profile system 380 may access a database 400 in contact storage 388 to obtain the information about the user placing the call, such as, for example one or more greeting identified with the hearing-capable user 310, 320 placing the call, the hearing-impaired user 390 receiving the call, or a combination thereof. The greeting information may be returned to the call distribution system 360. For the case of FIG. 3A, the database would be queried for incoming call greetings, meaning greetings to use with the hearing-capable user 310, 320 when the deaf user 390 is being called.

As non-limiting examples, if the hearing-capable user 310, 230 is in the deaf user's contact list, the database may include a custom greeting tailored to that specific contact. Otherwise, the deaf user 390 may have a default greeting to use in the case where the call comes from someone not in the contact list.

The call distribution system 360 may then assign the incoming call to a translator 330 to handle the call. If a translator is not available, the incoming call may be placed on a queue 368 for subsequent acceptance by a suitable translator 330. The queue 368 may include any greetings correlated with the specific incoming call.

Each translator 330, for the VRS 350 has voice-capable equipment 332 for communication with the hearing-capable user 310, 320, and video-capable equipment 336 for communication with the hearing-impaired user 390 in a suitable gesture language. A computer 334 or other processing hardware may be used in conjunction with, or instead of standalone voice-capable equipment 332 and video-capable equipment 336. For example, the translator 330 may use a computer 334 coupled to a camera, a microphone, and speakers or headphones for all the communications.

When a translator 330 is free, a new incoming call from the queue 368 is forwarded 318 to the translator 330. The translator 330 then answers the call with the greeting provided from the profile system 380.

The translator 330 connects to the hearing-impaired user 390 (may also be referred to herein as a deaf user) with a video-capable connection 338 through the video-capable network 370, a video-capable connection 398 at the deaf user's side, and video-capable equipment 392 at the deaf user's side. Additional details of how this automated connection process for managing custom greeting are provided below in the discussion of FIG. 4-7.

The database 400 maintained at the VRS 350 may be created, modified and updated by the hearing-impaired user 390 through a network connection 394 to the profile system 380 in the VRS 350. This network connection 394 may be any suitable network, such as for example the internet, and if different from the internet, the voice-capable network 302 or the video-capable network 370. The network connection 394 may also include tools such as web pages for viewing, updating and managing a phone book (i.e., database 400) by and for the hearing-impaired user 390. This phone book may include tools for managing greetings as explained more fully below with reference to FIGS. 5 and 6.

Figure 3B:
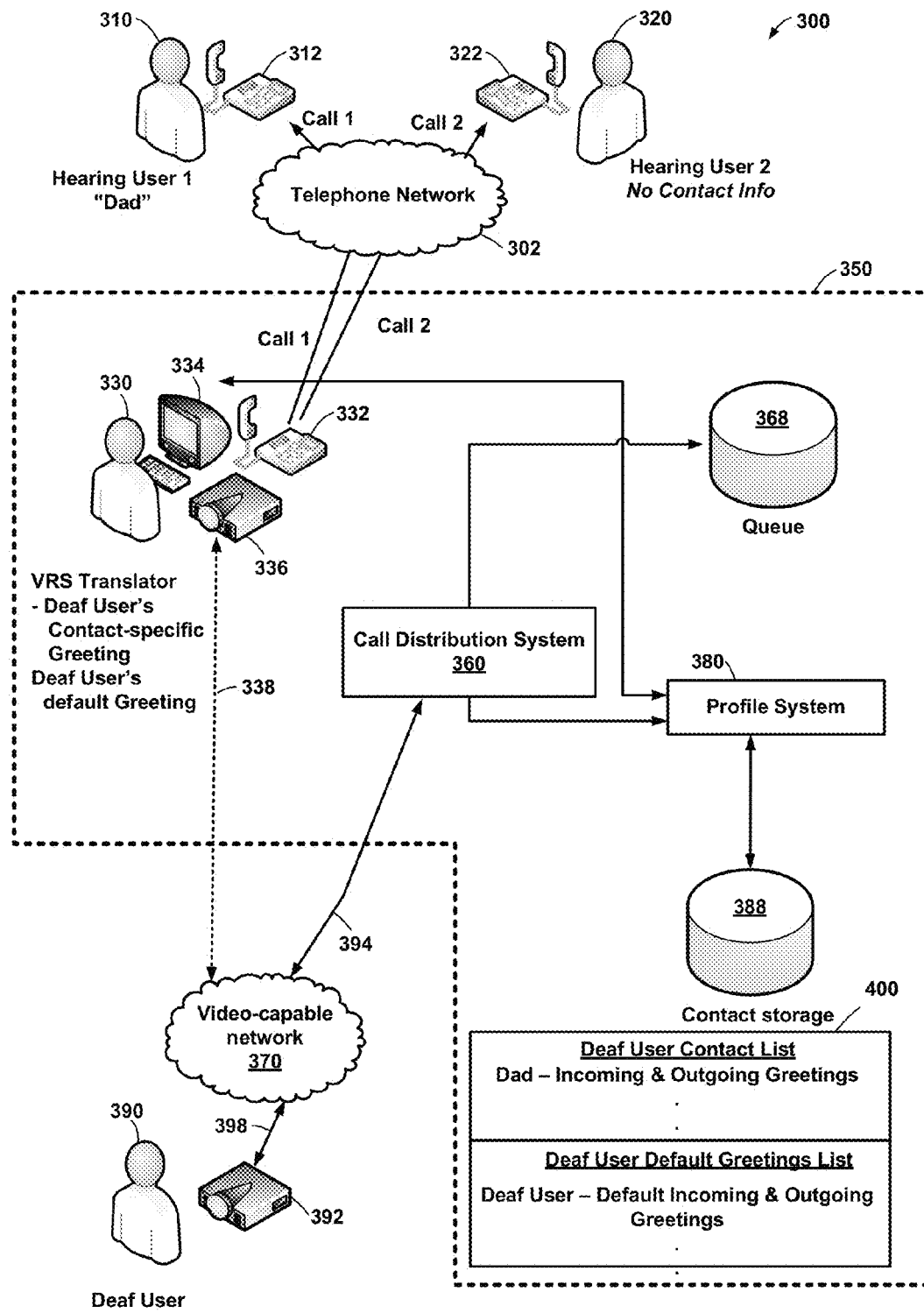
FIG. 3B illustrates a simplified block diagram illustrating a VRS configured for operation with a hearing-impaired communication system and showing a calling process from a hearing-impaired user.

FIG. 3B illustrates a simplified block diagram illustrating a VRS configured for operation with a hearing-impaired communication system and showing a calling process from a hearing-impaired user.

Within the VRS 350, the call distribution system 360 answers calls from the deaf user 390 through calling connection 394 and routes them to the call distribution system 360.

The outgoing calls include a calling connection indicator such as, for example, a telephone number, an Internet Protocol (IP) address, a website address or other unique indicator that indicates how the connection is made and from where the connection is made. The outgoing call also includes a similar indicator for the hearing-capable user that is being called.

The call distribution system 360 may query a profile system 380 to determine information about the hearing-capable user 310, 320 receiving the call in response to the calling connection indicator, as is explained more fully below in the descriptions of FIGS. 4 and 5. The profile system 380 may access a database 400 in contact storage 388 to obtain the information about the user receiving the call, such as, for example one or more greeting identified with the hearing-capable user 310, 320 receiving the call, the hearing-impaired user 390 placing the call, or a combination thereof. The greeting information may be returned to the call distribution system 360. For the case of FIG. 3AB, the database would be queried for outgoing call greetings, meaning greetings to use with the hearing-capable user 310, 320 when the deaf user 390 is making the call.

As non-limiting examples, if the hearing-capable user 310, 230 is in the deaf user's contact list, the database may include a custom greeting tailored to that specific contact. Otherwise, the deaf user 390 may have a default greeting to use in the case where the call comes from someone not in the contact list.

The call distribution system 360 may then assign the incoming call to a translator 330 to handle the call. If a translator is not available, the incoming call may be placed on a queue 368 for subsequent acceptance by a suitable translator 330. The queue 368 may include any greetings correlated with the specific outgoing call.

Each translator 330, for the VRS 350 has voice-capable equipment 332 for communication with the hearing-capable user 310, 320, and video-capable equipment 336 for communication with the hearing-impaired user 390 in a suitable gesture language. A computer 334 or other processing hardware may be used in conjunction with, or instead of standalone voice-capable equipment 332 and video-capable equipment 336. For example, the translator 330 may use a computer 334 coupled to a camera, a microphone, and speakers or headphones for all the communications.

When a translator 330 is free, a new outgoing call from the queue 368 is forwarded 318 to the translator 330. The translator 330 then uses the greeting provided from the profile system 380 when the hearing-capable user answers the call.

At some time during this process, the translator 330 also connects to the hearing-impaired user 390 with a video-capable connection 338 through the video-capable network 370, a video-capable connection 398 at the deaf user's side, and video-capable equipment 392 at the deaf user's side. Additional details of how this automated connection process for managing custom greeting are provided below in the discussion of FIG. 4-7.

FIGS. 4 and 5 are block diagrams illustrating entries in database 400. In the table of FIG. 4, the database 400 may be thought of as a contact list or phone book for the hearing-impaired user 390 that identifies preferred greetings for the listed contacts. As a result, each the hearing-impaired user 390 would have a separate table.

As explained below, the video phone 392 may include a keypad, keyboard, or mouse, or other data entry device configured to enable the hearing-impaired user 390 to initiate a communication session in a conventional manner by entering the telephone number of a hearing-capable user 310, 320. In addition, the hearing-impaired user 390 may be able to interact with database 400 using data entry devices to make changes to the database 400 through the network connection 394.

The database includes entries 410 for contacts 420 of the hearing-impaired user 390. Each entry 410 may include a name for the contact 420, one or more connection indicators 430 for the contact 420, incoming custom greetings 440 and outgoing custom greetings 450. Of course, other fields (not shown) useful in a phone book type database 400 may also be included. When a contact 420 makes a call that is received by the VRS 350, a calling connection indicator indicates the source of the call from the contact 420 (e.g., the cell phone number for Dad). The profile system may be used to correlate the calling connection indicator to an identified entry 410 (indicated by the dashed line to the entry for Dad) based on the connection indicators 430 associated with the identified entry 410.

As non-limiting examples, the connection indicators 430 may include web-site addresses associated with the contact 420, Internet Protocol (IP) addresses associated with the contact 420, wireless phone numbers associated with the contact 420 and wire-line phone number associated with the contact 420. A connection indicator 430 uniquely identifies a contact 420 within the database as well as a means of voice-capable connection 316, 326 (FIG. 3) to the VRS 350, the hearing-impaired user 390, and combinations thereof. For example, suppose the hearing-impaired-user who the contact list table of FIG. 4 is associated with makes an outgoing call to "Dad" then the database would return that custom outgoing greeting of "Hi Dad, I need money!"

In the table of FIG. 5, the database 400 may be thought of as a listing of hearing-impaired users 390 that use the VRS service. The database includes entries 460 for hearing-impaired users 390. Each entry 460 may include a name 470 for the hearing-impaired users 390. Alternatively, the entry 470 may be associated with one or more connection indicators 430 for the hearing-impaired users 390. A default incoming custom greetings 480 and default outgoing custom greeting 490 may also be included. Of course, other fields (not shown) useful in a phone book type database 400 may also be included. When a hearing-capable user makes or receives a call and that person is not in the hearing-impaired user's contact list 410, the database will select the default greeting that is appropriate for the hearing-impaired user and the nature of the call (i.e., incoming or outgoing). For example, suppose a hearing-capable user makes an incoming call to "John Son" and that hearing-capable user is not in the contact list (i.e., the table of FIG. 4) for John Son. The database would then return the default incoming greeting for John Son, of; "You've reached John's phone. I'm being connected please wait."

Figure 6:
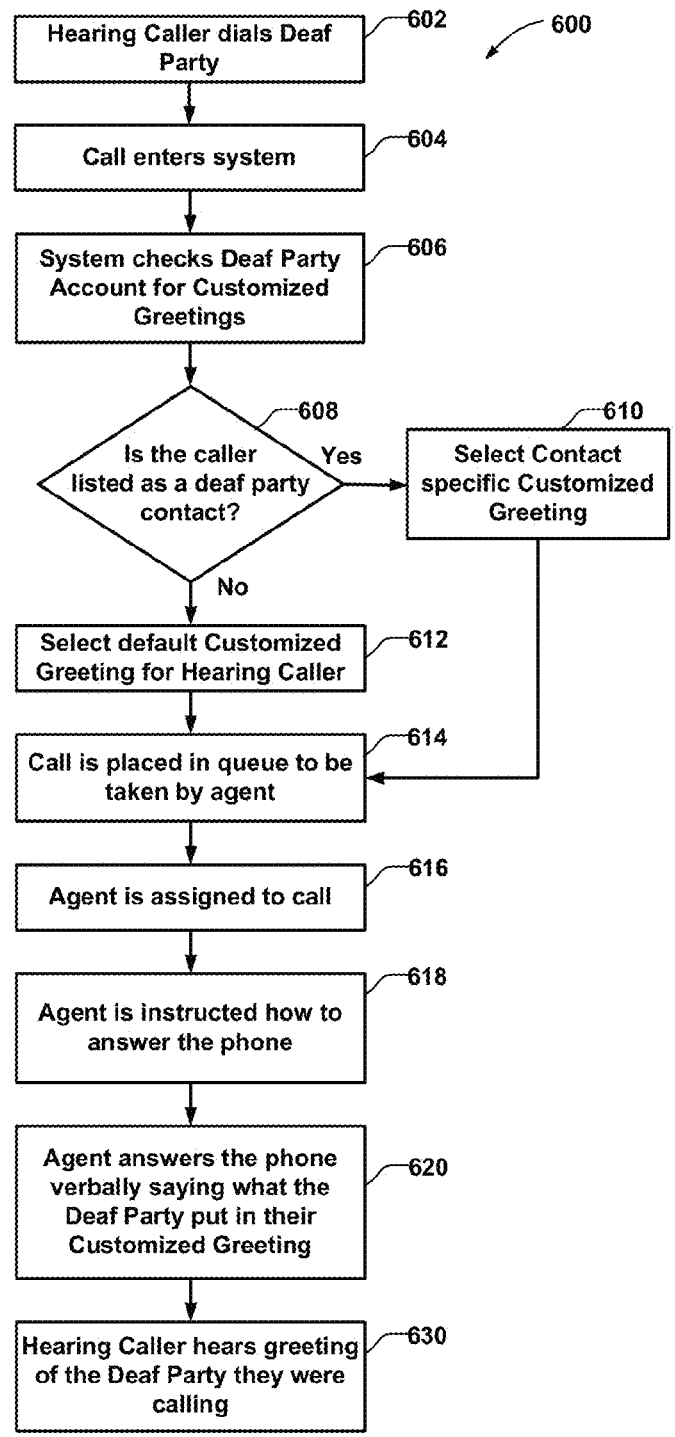
FIG. 6 is a simplified flow diagram illustrating a servicing process for a call placed to a hearing-impaired user.

FIG. 6 is a simplified flow diagram illustrating a servicing process for a call placed to a hearing-impaired user. In describing the processes of FIG. 6 reference may also be made to FIGS. 3A, 4 and 5. An incoming call process 600 may include actions for receiving a call from the hearing-capable user 310, 320. Operation block 602 indicates that a hearing-capable user 310, 320 places a call to a hearing-impaired user 390. This call will have a calling connection indicator associated with it indicating from where the call was placed (e.g., an IP address). Operation block 604 indicates that the call is received by the VRS 350 and enters the call distribution system 360.

Operation block 606 indicates that the system checks for contact information. In other words, the call distribution system 360 may inquire the profile system 380 to see if there is a contact 420 in the database 400 with a connection indicator 430 that matches the calling connection indicator of the person making the call. Decision block 608 indicates this test to see if the calling party is listed as a contact for the deaf party 390.

If the caller is listed as a contact 420 in the database 400, operation block 610 indicates that the appropriate incoming custom greeting is selected that is associated with the hearing-capable user making the call. If the caller is not listed as a contact 420 in the database 400, operation block 612 indicates that the appropriate incoming default greeting is selected that is associated with the hearing-impaired user receiving the call.

After selecting a greeting, either custom from operation 610 or default from operation 612, the call is placed in the queue to be taken by a translator at operation 614. In some embodiments, if there is translator available immediately placing the call in the queue may be bypassed.

At operation 616 a translator is assigned to the call and at operation 618, the translator is instructed how to greet the hearing-capable user when the translator answers. At operation 620 the translator verbally answers the call with the customized greeting designed by the hearing-impaired user being called. Finally, at operation 630, the hearing-capable user hears the custom greeting.

At some point during this process, the connection to the hearing-impaired user may also be processed so that the two end parties are ready to begin a conversation with the assistance of the translator.

Figure 7:
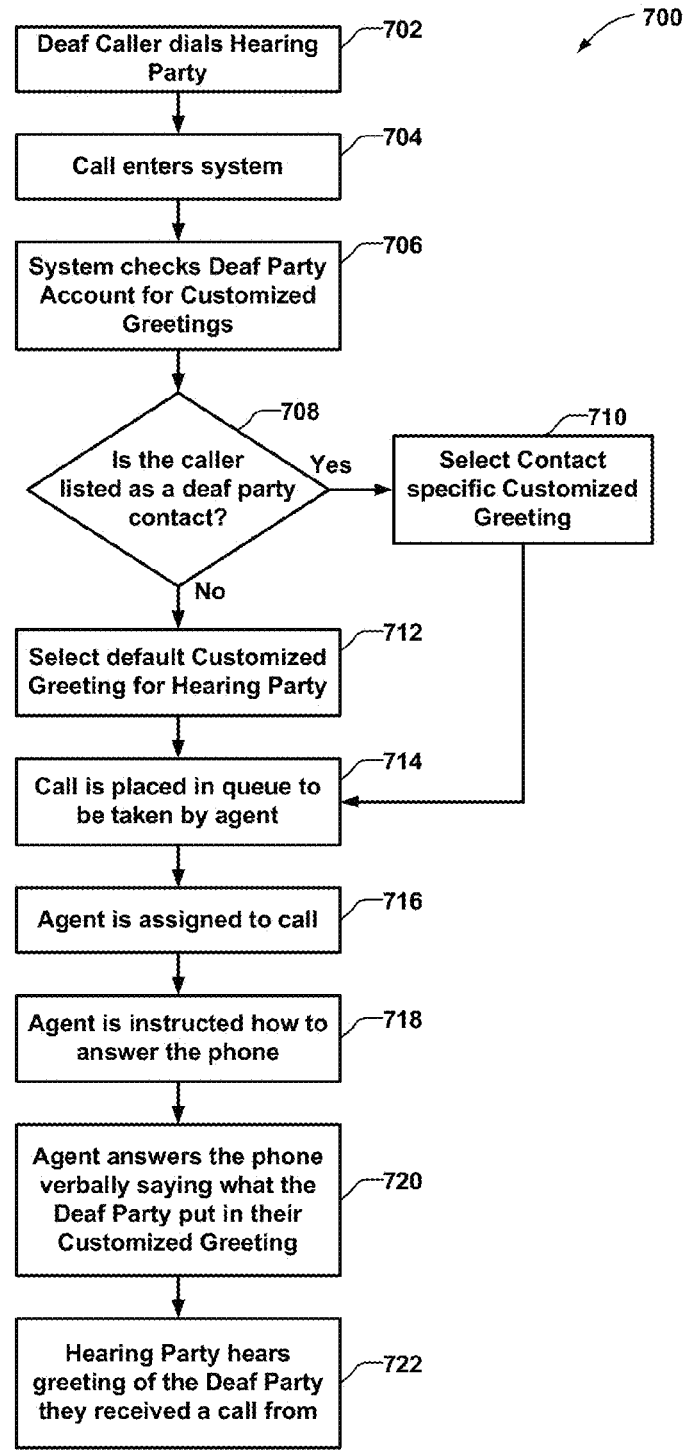
FIG. 7 is a simplified flow diagram illustrating a servicing process for a call placed from a hearing-impaired user.

FIG. 7 is a simplified flow diagram illustrating a servicing process for a call placed from a hearing-impaired user. In describing the processes of FIG. 7 reference may also be made to FIGS. 3B, 4 and 5. An outgoing call process 700 may include actions for sending a call from the hearing-impaired user 390 to a hearing-capable user 310, 320. Operation block 702 indicates that a hearing-impaired user 390 places a call to a hearing-capable user 310, 320. This call may have a calling connection indicator associated with it indicating from where the call was placed (e.g., an IP address). The call will also have a calling connection indicator associated with it indicating to whom the call is being placed (e.g., a telephone number). Operation block 704 indicates that the call is received by the VRS 350 and enters the call distribution system 360.

Operation block 708 indicates that the system checks for contact information. In other words, the call distribution system 360 may inquire the profile system 380 to see if there is a contact 420 in the database 400 with a connection indicator 430 that matches the calling connection indicator of the person being called. Decision block 708 indicates this test to see if the called party is listed as a contact for the deaf party 390.

If the called party is listed as a contact 420 in the database 400, operation block 710 indicates that the appropriate outgoing custom greeting is selected that is associated with the hearing-capable user receiving the call. If the caller is not listed as a contact 420 in the database 400, operation block 712 indicates that the appropriate outgoing default greeting is selected that is associated with the hearing-impaired user sending the call.

After selecting a greeting, either custom from operation 710 or default from operation 712, the call is placed in the queue to be taken by a translator at operation 714. In some embodiments, if there is translator available immediately placing the call in the queue may be bypassed.

At operation 716 a translator is assigned to the call and at operation 718, the translator is instructed how to greet the hearing-capable user when that party answers. At operation 720 the translator verbally answers the call with the customized greeting designed by the hearing-impaired user placing the call. Finally, at operation 722, the hearing-capable user hears the custom greeting.

Returning to FIG. 3, if the hearing-impaired user 390 is voice-incapable, then communication with the translator 330 occurs primarily through the use of gestures such as a suitable sign language. If the hearing-impaired user 390 is voice-capable, then communication with the translator 330 may be performed by the hearing-impaired user 390 expressing themselves through voice signals and receiving communication from the translator 330 through the use of sign language or text based interfaces.

For voice-incapable hearing-impaired users 390, the sign language images are translated or interpreted by the translator 330 providing a level of relay service defined as the "video relay service." When the sign language images are translated by translator 330 of the relay service 350 they are forwarded as voice information over the voice-capable connection 316, 326 to the hearing-capable user 310, 320. The hearing-capable user 310, 320 interacts in a conventional manner with the translator 330 through the use of voice-based dialog conveyed over the voice-capable connection 316, 326.

For voice-capable hearing-impaired users 390, extensions of relay services have included the development of voice bridges known as Voice Carry-Over (VCO) which enable the voice-capable hearing-impaired user 390 to speak directly to the hearing party. In such an application, the VRS 350 may form the voice bridge or conferencing of the voice-capable hearing-impaired user's voice. In such a service configuration, once the conference call is established, the translator 330, 340 is employed only for the conversion of the voice portion of the call from the hearing-capable user 310, 320 that is to be delivered to the hearing-impaired user 390. It should be apparent that not all hearing-impaired individuals have adequate or intelligible speech capabilities for utilization of a relay service configured to provide VCO services. However, such an arrangement does provide a more efficient and personal method of communication between a voice-capable hearing-impaired user and another individual.

Figure 8:
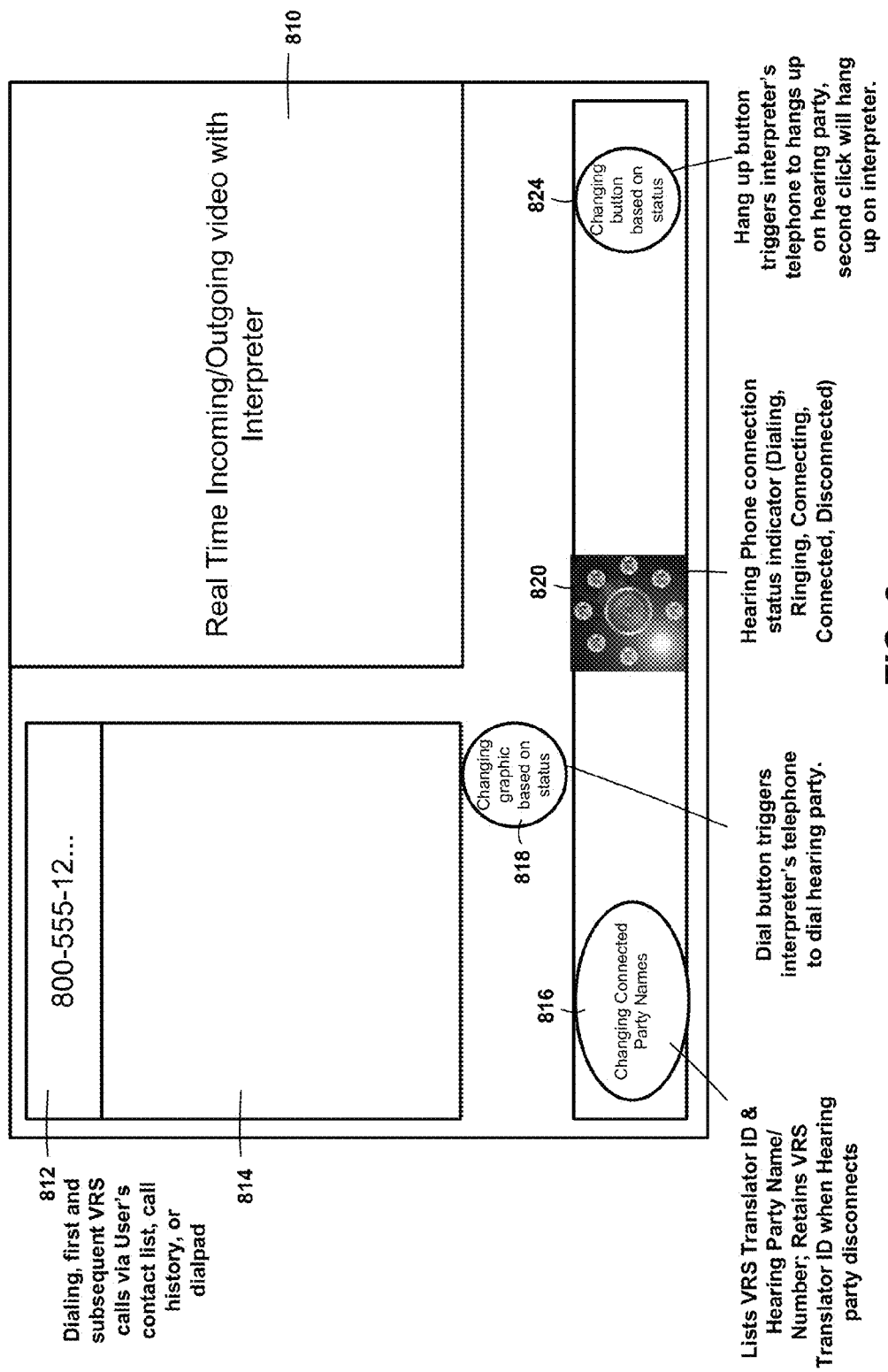
FIG. 8 is a simplified Graphical User Interface (GUI) illustrating some controls and notifications that may be available to the hearing-impaired user.

FIG. 8 is a simplified Graphical User Interface (GUI) illustrating some controls and notifications that may be available to the hearing-impaired user. A video window 810 may be included to display real time incoming and outgoing video with the interpreter. A calling number indicator 812 may be present to indicate the current number that is being called. As non-limiting examples, this number could come from the user entering it on a dialpad, selecting it from a call history, or selecting it from a contact list. A list window 814 may be included to display list elements such as the call history and the contact list.

A connection display indicator 816 may be included to show current connections and information related to the current call. As non-limiting examples, this indicator may display a translator ID, a hearing party's name, and a hearing party's number. In some embodiments, the connection to the hearing party may be terminated, but the connection to the translator may be maintained.

A call connection selector 818 (e.g., a dial button) may be presented to allow the user to cause the computing device to send instructions to the relay service to make a calling connection with a hearing-capable user without intervention from the translator.

A call disconnect selector 824 (e.g., a hang up button) may be presented to allow the user to cause the computing device to send instructions to the relay service to disconnect the hearing-capable user without intervention from the translator. In some embodiments, this selection may also cause the translator to be disconnected. In other embodiments, this may maintain the connection with the translator so the user can make another call. In such embodiments selection of the call disconnect selector 824 a second time may cause the translator to be disconnected.

A connection status indicator 820 may be included to show the present status of the calling connection to the hearing phone. As a non-limiting example, there may be a different status indicator to show no connection, a dialing status, a ringing status, and a connected status. For some status indicators (e.g., the dialing status and the ringing status) a LightRing animation may be presented. This animation may show an emulation of a lens 990 and a light group 980. For example the lights may alternatively light in a circular pattern while the connection is in a ringing status. In addition this status indicator may be configured to emulate other LightRing configuration, such as, for example those disclosed in U.S. Pat. No. 7,769,141 to Cupal et al., the contents of which is herby incorporated by reference in its entirety.

Although the present invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A method for enabling electronic communication with a hearing-capable user and a hearing-impaired user, comprising:
 selecting an identified entry from a database comprising one or more entries, wherein each of the one or more entries is associated with a contact of the hearing-impaired user and includes one or more connection indicators for the contact and one or more custom greetings for the contact, and the identified entry is selected responsive to the one or more connection indicators for the hearing-capable user; and establishing a calling connection between the hearing-capable user and a translator at a relay service and instructing the translator to greet the hearing-capable user with one of the one or more custom greetings.

2. The method of claim 1, wherein establishing the calling connection between the hearing-capable user and the translator at the relay service comprises establishing the calling connection at the direction of the hearing-impaired user without intervention from the translator.

3. The method of claim 1, further comprising interrupting the calling connection between the hearing-capable user and the translator at the direction of the hearing-impaired user without intervention from the translator.

4. The method of claim 3, further comprising maintaining a connection between the hearing-impaired user and the translator after interrupting the calling connection.

5. The method of claim 4, further comprising establishing another calling connection between another hearing-capable user and the translator while the connection between the hearing-impaired user and the translator is maintained.

6. The method of claim 1, wherein the one or more custom greetings include a custom outgoing call greeting for a second hearing-capable user that is not in the database and a custom incoming call greeting for the second hearing-capable user that is not in the database.

7. The method of claim 1, wherein the one or more custom greetings include a custom outgoing call greeting created for the hearing-capable user and a custom incoming call greeting created for the hearing-capable user.

8. A relay service for providing translation services between a hearing-impaired user and a hearing-capable user, comprising:

a database with one or more entries, each of the one or more entries associated with a contact of the hearing-impaired user and including one or more connection indicators for the contact and one or more custom greetings for the contact; and a profile system configured to determine an identified entry in the database using a calling connection indicator associated with the hearing-capable user to compare with the one or more connection indicators; and a call distribution system configured to:
    establish a calling connection over a voice-capable network between the hearing-capable user and a translator at the relay service using the calling connection indicator associated with the hearing-capable user; and
    instruct the translator to greet the hearing-capable user using one of the one or more custom greetings.

9. The relay service of claim 8, wherein the one or more custom greetings include a custom outgoing call greeting for a second hearing-capable user that is not in the database.

10. The relay service of claim 8, wherein the one or more custom greetings include a custom incoming call greeting for a second hearing-capable user that is not in the database.

11. The relay service of claim 8, wherein the one or more custom greetings include a custom outgoing call greeting created for the hearing-capable user.

12. The relay service of claim 8, wherein the one or more custom greetings include a custom incoming call greeting created for the hearing-capable user.

13. The relay service of claim 8, wherein the call distribution system is further configured to establish a video-capable connection between the translator and the hearing-impaired user over a video-capable network.

14. The relay service of claim 8, wherein the call distribution system is configured to establish the calling connection between the hearing-capable user and the translator at the direction of the hearing-impaired user without intervention from the translator.

15. The relay service of claim 8, wherein the call distribution system is configured to interrupt the calling connection between the hearing-capable user and the translator at the direction of the hearing-impaired user without intervention from the translator.

16. The relay service of claim 15, wherein the call distribution system is configured to maintain a connection between the hearing-impaired user and the translator after interrupting the calling connection.

17. A computing device for use by a hearing-impaired user, comprising:

a display for presenting a GUI to a hearing-impaired user;
a memory configured for storing computing instructions; and
a processor operably coupled to the memory and configured for executing the computing instructions to:
    cause the display to present a call connection selector on the GUI; and
    send instructions to a relay service to make a calling connection between a hearing-capable user and the relay service at the direction of the hearing-impaired user without intervention from a translator responsive to the hearing-impaired user selecting the call connection selector;
cause the display to present a call disconnect selector on the GUI; and
send instructions to the relay service to disconnect the calling connection between the relay service and the hearing-capable user at the direction of the hearing-impaired user without intervention from the translator responsive to the hearing-impaired user selecting the call disconnect selector.

18. The computing device of claim 17, wherein the processor is further configured for executing the computing instructions to send instructions to the relay service to disconnect the calling connection between the relay service and the hearing-capable user, but not a connection between the hearing-impaired user and the relay service, at the direction of the hearing-impaired user without intervention from the translator responsive to the hearing-impaired user selecting the call disconnect selector.

19. The computing device of claim 18, wherein the processor is further configured for executing the computing instructions to send instructions to the relay service to disconnect the connection between the hearing-impaired user and the relay service at the direction of the hearing-impaired user responsive to the hearing-impaired user selecting the call disconnect selector again.

20. A computing device for use by a hearing-impaired user, comprising:

a display for presenting a GUI to a hearing-impaired user;
a memory configured for storing computing instructions; and
a processor operably coupled to the memory and configured for executing the computing instructions to:
    cause the display to present a call connection selector on the GUI;
    send instructions to a relay service to make a calling connection between a hearing-capable user and the relay service at the direction of the hearing-impaired user without intervention from a translator responsive to the hearing-impaired user selecting the call connection selector; and cause the display to present a call status indicator on the GUI to indicate when the calling connection between the relay service and the hearing-capable user is connected.

21. The computing device of claim 20, wherein the processor is further configured for executing the computing instructions to cause the display to present a second call status indicator on the GUI to indicate when the calling connection is dialing and a third call status indicator on the GUI to indicate when the calling connection is ringing.

22. The computing device of claim 21, wherein the processor is further configured for executing the computing instructions to cause the display to present at least one of the second call status indicator and the third call status indicator as a light ring.

23. A method for enabling electronic communication with a hearing-capable user and a hearing-impaired user, comprising:

enabling a hearing-impaired user to provide a default incoming custom greeting and a default outgoing custom greeting;

storing data corresponding to the default incoming custom greeting and the default outgoing custom greeting;

establishing a calling connection between a translator at a relay service on behalf of the hearing-impaired user and a hearing-capable user;

instructing the translator to greet the hearing-capable user with the default incoming custom greeting if the calling connection is an incoming calling connection from the hearing-capable user; and instructing the translator to greet the hearing-capable user with the default outgoing custom greeting if the calling connection is an outgoing calling connection to the hearing-capable user.

24. The method of claim 23, further comprising enabling the hearing-impaired user to disconnect the calling connection without intervention from the translator.

25. The method of claim 24, wherein enabling the hearing-impaired user to disconnect the calling connection without intervention from the translator further comprises maintaining a video-capable connection between the hearing-impaired user and the translator after the hearing-impaired user disconnects the calling connection.

\* \* \* \* \*